United States Patent
Cook

(10) Patent No.: US 11,299,970 B2
(45) Date of Patent: Apr. 12, 2022

(54) SYSTEM, METHOD, AND COMPOSITION FOR CONTROLLING FRACTURE GROWTH

(71) Applicant: Sage Geosystems Inc., Bellaire, TX (US)

(72) Inventor: Robert Lance Cook, Houston, TX (US)

(73) Assignee: Sage Geosystems Inc., Bellaire, TX (US)

(*) Notice: Subject to any disclaimer, the term of this patent is extended or adjusted under 35 U.S.C. 154(b) by 0 days.

(21) Appl. No.: 16/696,441

(22) Filed: Nov. 26, 2019

(65) Prior Publication Data

US 2020/0165909 A1    May 28, 2020

Related U.S. Application Data

(60) Provisional application No. 62/771,501, filed on Nov. 26, 2018.

(51) Int. Cl.
    *E21B 43/26*    (2006.01)
(52) U.S. Cl.
    CPC .................... *E21B 43/26* (2013.01)
(58) Field of Classification Search
    CPC .............. E21B 43/26; C09K 8/62; C09K 8/80
    See application file for complete search history.

(56) References Cited

U.S. PATENT DOCUMENTS

| | | | | |
|---|---|---|---|---|
| 3,954,142 A | * | 5/1976 | Broaddus ................ | C09K 8/72 166/307 |
| RE30,484 E | * | 1/1981 | Broaddus ................ | E21B 43/26 166/307 |
| 4,515,214 A | * | 5/1985 | Fitch ...................... | E21B 43/26 166/250.1 |
| 4,887,670 A | * | 12/1989 | Lord .................... | E21B 43/261 166/281 |
| 5,159,979 A | * | 11/1992 | Jennings, Jr. ............ | C09K 8/62 166/308.2 |
| 5,411,091 A | * | 5/1995 | Jennings, Jr. ........ | E21B 43/267 166/280.1 |
| 5,875,843 A | * | 3/1999 | Hill ...................... | E21B 43/267 166/250.1 |
| 8,839,865 B2 | * | 9/2014 | Willberg ................ | E21B 43/26 166/300 |
| 10,619,088 B2 | * | 4/2020 | Nguyen ................ | E21B 43/247 |
| 2014/0060826 A1 | * | 3/2014 | Nguyen ................ | E21B 43/267 166/280.1 |

OTHER PUBLICATIONS

Sparkman, Deane et al.,"Real-time Monitoring 'Steers' Fractures", The American Oil & Gas Reporter, Dec. 2009, 4 pgs.

* cited by examiner

*Primary Examiner* — Matthew R Buck
(74) *Attorney, Agent, or Firm* — Patent Law Works, LLP; Craig Buschmann

(57) ABSTRACT

A system, composition and method for controlling vertical growth direction (up and down) of one or more fractures and/or rate of growth of one or more fractures by varying the specific gravity of one or more slurries or fluids being pumped into a well during a fracking operation.

10 Claims, 7 Drawing Sheets

How fracks grow: High Fluid Weight Frack Fluid

Top of frack at 900'
Casing perforation @ 1000'
Bottom of frack at 1100'

*Imagine perfect penny shaped fracture exists around a casing perforation*

- Frack Fluid in well is 1.5 psi/ft
  - Pressure at top of frack is 1350 psi
  - Pressure at perf is 1500 psi
  - Pressure at bottom of frack is 1650 psi

- Frack Gradient for formation is 1.0 psi/ft
  - Frack pressure at top of frack is 900 psi
  - Frack Pressure at perf is 1000 psi
  - Pressure at bottom of frack is 1100 psi

- If pumps simply keep the hole full with the 1.5 psi/ft fluid, the pressure at the top and the bottom of the frack will be 450 and 550 psi over the frack gradient (respectively).
- Thus the frack will grow in all directions in 2 dimensions with a bias toward downward growth.
- Thus, all things being equal, fracture fluids can be designed which will steer the frack to have a bias toward downward growth by having the gradient of the fluid exceed the rock's fracture gradient.

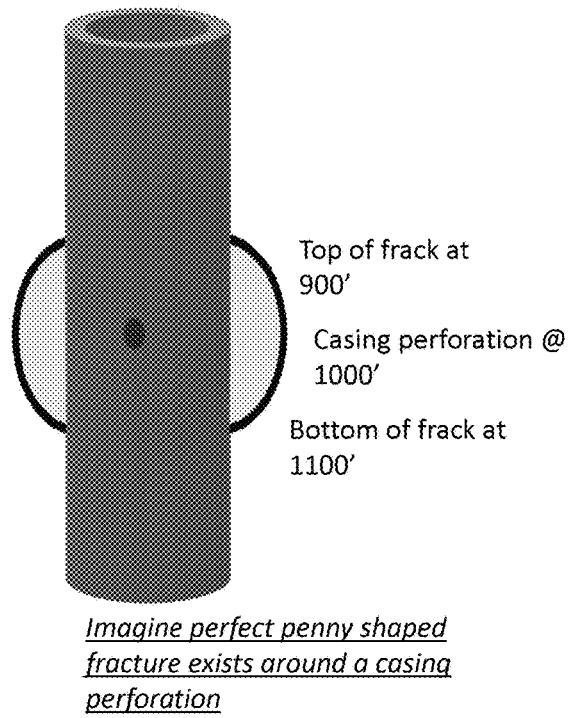

How fracks grow: Normal Frack Fluid

- Frack Fluid in well is .5 psi/ft
  - Pressure at top of frack is 450 psi
  - Pressure at perf is 500 psi
  - Pressure at bottom of frack is 550 psi

- Frack Gradient for formation is 1.0 psi/ft
  - Frack pressure at top of frack is 900 psi
  - Frack Pressure at perf is 1000 psi
  - Pressure at bottom of frack is 1100 psi

- If pumps are brought up slowly, once the pressure at the wellhead reaches 450+ psi, the top of the frack will grow upward in to weaker rock as the frack greadient of 900 psi is exceeded.
- Note that the bottom of the frack is still 100 psi from its frack pressure.
- Thus, all things being equal, fractures tend to grow up when surface pressure is used to frack a well.

Top of frack at 900'

Casing perforation @ 1000'

Bottom of frack at 1100'

_Imagine perfect penny shaped fracture exists around a casing perforation_

FIG. 1

How fracks grow: Frack Fluid equal to Frack Gradient

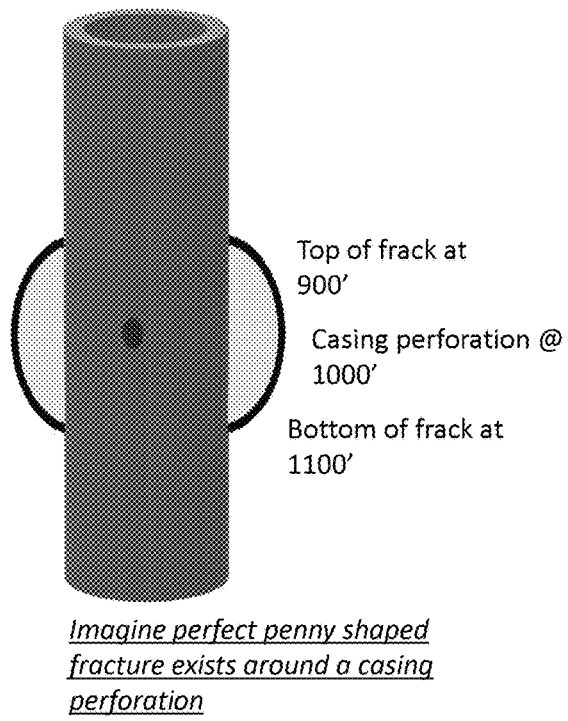

Top of frack at 900'

Casing perforation @ 1000'

Bottom of frack at 1100'

*Imagine perfect penny shaped fracture exists around a casing perforation*

- Frack Fluid in well is 1.0 psi/ft
  - Pressure at top of frack is 900 psi
  - Pressure at perf is 1000 psi
  - Pressure at bottom of frack is 1100 psi

- Frack Gradient for formation is 1.0 psi/ft
  - Frack pressure at top of frack is 900 psi
  - Frack Pressure at perf is 1000 psi
  - Pressure at bottom of frack is 1100 psi

- If pumps exert any pressure at the surface, the fracture will grow equally in all directions and grow symmetrically
- Thus the frack will grow in all directions with a self correcting bias as the symmetry gets out of balance
- Thus, in theory and with all things being equal, fracture fluids can be designed which will steer the frack in a true penny shaped fracture if a truly homogeneous formation is ever found in the field by keeping the frack fluid density exactly equal to the frack gradient.

FIG. 2

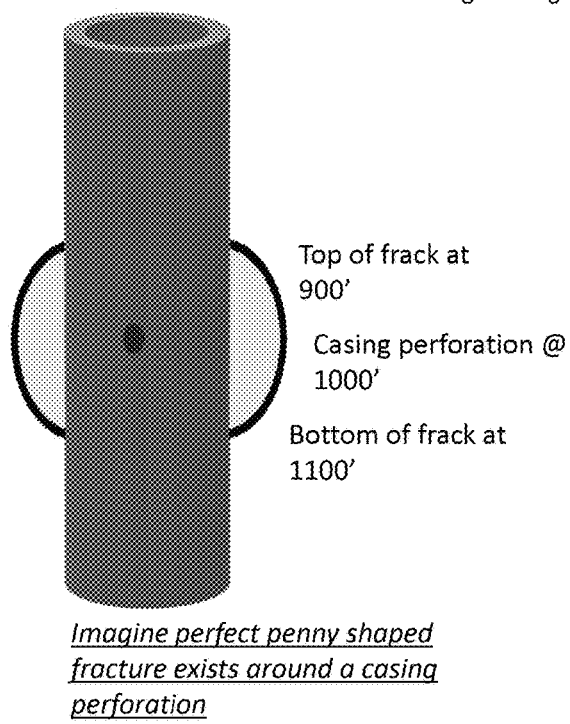

How fracks grow: High Fluid Weight Frack Fluid

Top of frack at 900'

Casing perforation @ 1000'

Bottom of frack at 1100'

*Imagine perfect penny shaped fracture exists around a casing perforation*

- Frack Fluid in well is 1.5 psi/ft
  - Pressure at top of frack is 1350 psi
  - Pressure at perf is 1500 psi
  - Pressure at bottom of frack is 1650 psi

- Frack Gradient for formation is 1.0 psi/ft
  - Frack pressure at top of frack is 900 psi
  - Frack Pressure at perf is 1000 psi
  - Pressure at bottom of frack is 1100 psi

- If pumps simply keep the hole full with the 1.5 psi/ft fluid, the pressure at the top and the bottom of the frack will be 450 and 550 psi over the frack gradient (respectively).

- Thus the frack will grow in all directions in 2 dimensions with a bias toward downward growth.

- Thus, all things being equal, fracture fluids can be designed which will steer the frack to have a bias toward downward growth by having the gradient of the fluid exceed the rock's fracture gradient.

FIG. 3

How fracks grow: Heavy weight fluid displaced by light weight fluid

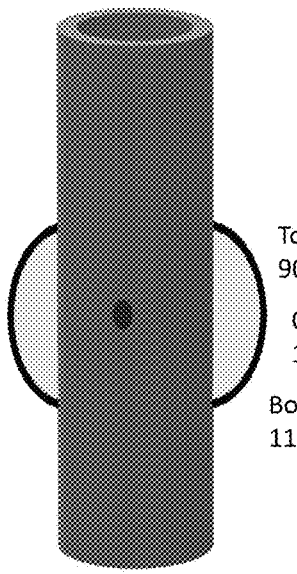

Top of frack at 900'

Casing perforation @ 1000'

Bottom of frack at 1100'

*Imagine perfect penny shaped fracture exists around a casing perforation*

- Frack Fluid in well bore is .5 psi/ft
  - Pressure at perf is 500 psi

- Frack Fluid displaced in to the fracture is 1.5 psi/ft
  - Pressure at top of frack is 350 psi
  - Pressure at perf is 500 psi
  - Pressure at bottom of frack is 650 psi

- Frack Gradient for formation is 1.0 psi/ft
  - Frack pressure at top of frack is 900 psi
  - Frack Pressure at perf is 1000 psi
  - Pressure at bottom of frack is 1100 psi

- When the light weight .5 psi/ft frack fluid has reached the perf while displacing the 1.5 psi/ft frack fluid, the surface pressure will be 450 psi.
- Note that the pressure to frack the bottom of the frack is equaled at 450 psi. While we are still 100 psi short of growing the fracture up. Thus the frack will grow strictly down until a balance is reached in the fracture of low gradient .5 psi/ft fluid and 1.5 psi/ft fluid.
- Thus, all things being equal, fractures tend to grow down when the fluid inside the fracture is dominated by a fluid which greater than the frack gradient.

FIG. 4

SYSTEM, METHOD, AND COMPOSITION FOR CONTROLLING FRACTURE GROWTH

CROSS REFERENCE TO RELATED APPLICATIONS

This application claims priority to U.S. Provisional Application 62/771,501, filed Nov. 26, 2018, which is incorporated herein by reference in its entirety.

BACKGROUND OF THE INVENTION

This disclosure relates to systems, methods, and compositions for fracturing subterranean formations. More particularly, the disclosed invention teaches systems, methods, and compositions for controlling fracture growth.

Hydraulic fracturing, or fracking, is a process for extracting oil and/or gas from a well. Fracking generally is used to create fractures in a rock formation by injecting the rock with a pressurized liquid. High pressure injection of a fracking fluid into a wellbore creates cracks in rock formations through which natural gas and oil will flow more freely. When the hydraulic pressure is removed from the well, grains of hydraulic fracturing proppants can hold the fractures open.

Conventional fracking fluids generally have a lower gradient than the formation's fracture gradient, thereby causing fractures to have a tendency to grow in an upward direction. This tendency to grow up also manifests itself in a commonly heard complaint that in vertical wells, most frack fluid pumped in a well which is perforated in multiple zones goes into the shallowest perforated zone.

There is a need in the art for alternative systems, methods and compositions that are more economical and provide improved control over fracture growth. Current practices have proved too expensive and inefficient to justify most oil well drilling programs, particularly when oil is below $60 a barrel and natural gas is less than $3 a thousand cubic feet.

SUMMARY OF THE INVENTION

The present invention is directed to a system, method, and composition for controlling vertical growth direction (up and down) of one or more fractures and/or rate of growth of one or more fractures by varying the specific gravity of a slurry and/or fluid being pumped into a well during a fracking operation.

In one embodiment, this disclosure teaches inventive techniques for creating vertical fractures in a formation, preferably where at least 80% percent of the fracture growth can be controlled to grow either up or down in the formation. In a further preferred embodiment, at least 85%, 90% or 95% of fracture growth can be controlled to grow either up or down in the formation. In one embodiment, the larger the fracture size results in a higher percentage control of fracture growth in either up or down direction.

In another embodiment, this disclosure also teaches techniques for controlling the fracture's vertical growth direction in real time during a pumping operation through variable control of slurry densities being pumped.

In another embodiment, this disclosure teaches inventive techniques for preferentially holding open sections of fractures with proppant that is designed to migrate to the high side or low side or distribute equally along a vertical fracture by adding proppant that sinks, is neutrally buoyant, or is buoyant relative to the slurry in which it is mixed.

In another embodiment is a method to control the vertical growth of one or more fractures in a subterranean formation comprising introducing a first fracturing fluid or slurry of a first specific gravity into said formation and into at least one fracture formed therein, introducing a second fracturing fluid or slurry of a second specific gravity into said formation and into the at least one fracture formed therein, wherein the specific gravity of the second fracturing fluid or slurry is different from the specific gravity of the first fracturing fluid, thereby controlling the growth of the at least one fracture in a vertical direction.

In a preferred embodiment, the specific gravity of the slurry or fluid is varied by adding barite, hematite, or a combination thereof.

In a further preferred embodiment, the specific gravity of the slurry or fluid is varied by increasing and/or decreasing the weight of the slurry or fluid by increasing/decreasing the pounds per gallon of proppant per gallon of carrier fluid.

In another embodiment, the slurry or fluid comprises a material having a specific gravity of at least 3.0 or greater and the material increases the slurry or fluid density to steer the direction and/or rate of growth of vertical subterranean fractures. In a further embodiment, the slurry or fluid comprises a material having a specific gravity of at least 3.2, 3.4, 3.6, 3.8, 4.0, 4.2, 4.4, 4.6, 4.8, or 5.0.

In another embodiment, the specific gravity of the slurry or fluid is changed by varying the specific gravity of the carrier fluid used to suspend the proppant during a fracking operation.

In another embodiment, the specific gravity of the slurry or fluid is varied during the original frack design to pump one or more slurry or fluid densities on a predetermined or set schedule to obtain variable growth directions based on the geology of the well.

In another embodiment, zones at variable depths are open to be fracked during a single frack operation, and each zone is fracked by varying the densities with the heavier density slurry(ies) or fluid(s) accessing the deeper zones and the lighter slurry(ies) or fluid(s) accessing shallower formations.

In a further embodiment, surface and/or downhole pressure and temperature information indicating fracture growth rate and direction is used to vary slurry or fluid density to steer fracture growth. In a preferred embodiment, surface and/or downhole pressure and temperature information indicating fracture growth rate and direction is used as input into an automated manifold which automatically varies slurry and/or fluid densities being pumped downhole to steer fracture growth.

In another embodiment, surface and/or downhole real time seismic information indicating fracture growth rate and direction is used to vary slurry or fluid density to steer fracture growth in the real time. In a further preferred embodiment, surface and/or downhole real time seismic information indicating fracture growth rate and direction is used as input in to an automated manifold which automatically varies slurry and/or fluid densities to steer fracture growth.

In another embodiment, proppants of varying specific gravity are added such that the proppant either sinks, is neutrally buoyant, or is buoyant in the slurry being pumped. In a further preferred embodiment, a mix of proppants of specific gravities is pumped to either evenly distribute proppant vertically within the vertical fracture, or is designed such that either the upper or lower portion of a vertical frack is preferentially held open by proppant.

In another preferred embodiment, proppant of various specific gravity are chosen in order to distribute proppant preferentially within the fracture. In a preferred embodiment, the proppant comprises or consists of sand, fly ash or cenospheres. For example, the proppant can be sand (SG 2.65), fly ash (SGs between 1.7 and 2.4), and cenospheres (SG less than 1.0).

In another embodiment, batches of heavy and light weight slurries are mixed and then blended together to vary slurry density to steer fracture direction. In a further preferred embodiment, slurry density is varied on the fly in batch blenders and then pumped down hole.

With fracking cost often exceeding half the cost of getting a well to production, the disclosed techniques provide a significant advantage to the industry.

BRIEF DESCRIPTION OF THE DRAWINGS

FIG. 1 is a graphical illustration and description of the operation of a system, where fracking fluids generally have a lower gradient than the formation's fracture gradient, and fractures will have a tendency to grow in an upward direction.

FIG. 2 is a graphical illustration and description showing how using a fracking fluid that has a gradient equal to the formation's fracture gradient can create a symmetrical penny shaped frack in an ideal formation where the fluid's density can be maintained to exactly match that of the formations fracture gradient.

FIG. 3 is a graphical illustration and description showing how designing a fracking fluid which exceeds the formation's fracture gradient will create a fracture that grows both up and down, with a bias in the down direction.

FIG. 4 is a schematic illustration and description showing how pumping high density slurries greater than the formation fracture gradient followed by a light fluid with a gradient less than the fracture gradient of the formation can develop a gradient inside the fracture which promotes downward fracture growth.

DETAILED DESCRIPTION

Figure 5:
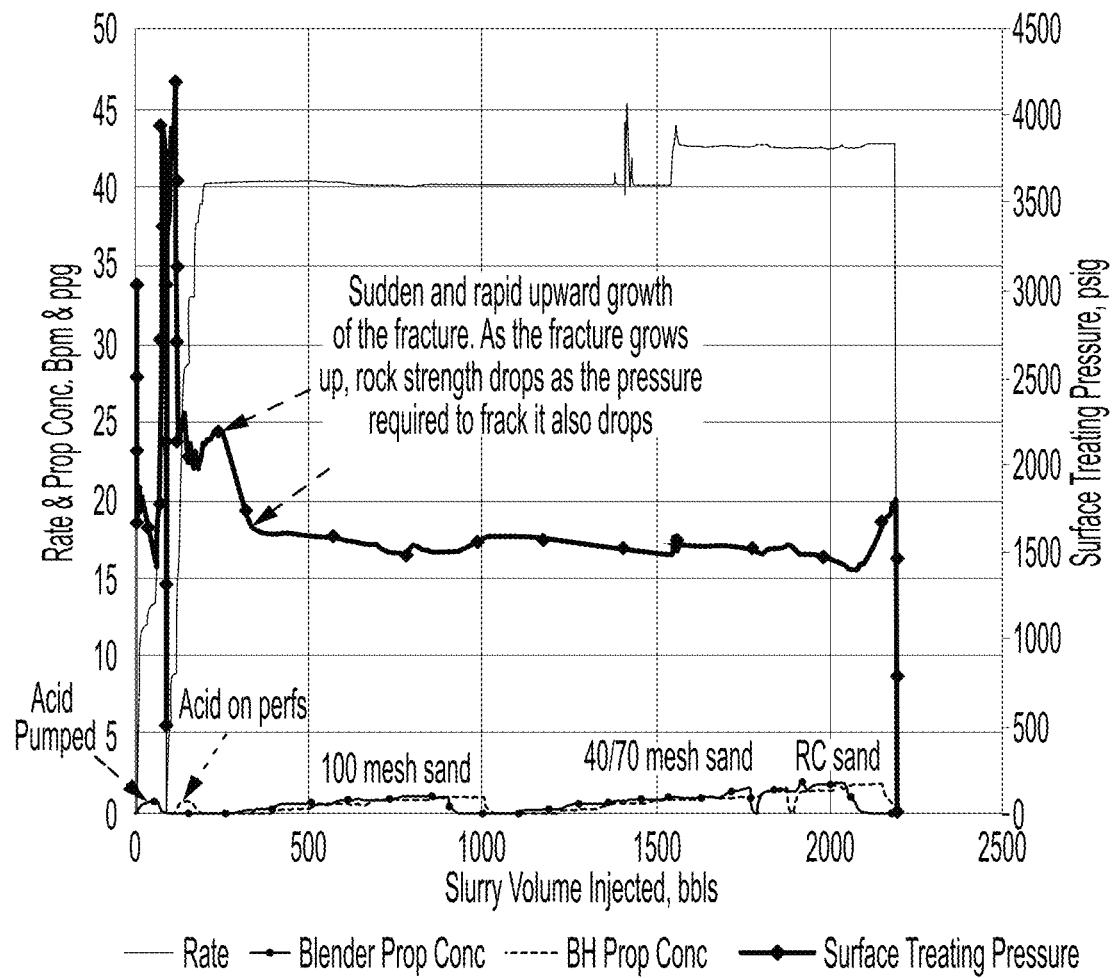
FIG. 5 is a graphical example of upward frack growth.

In the drawings and description that follows, like parts are marked throughout the specification and drawings with the same reference numerals, respectively. The drawings are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

The disclosed invention teaches various processes for steering fractures and/or propping them open in the vertical direction (up or down).

In FIGS. 1-4, item 1 is well casing, item 2 is a casing perforation (also referenced as a "perf"), item 3 is a fracture (also referenced as a "frack"), item 4 is the top of the fracture, and item 5 is the bottom of the fracture. As is shown in FIG. 1, current fracking practices, where fracking fluids almost always have a lower gradient than the formation's fracture gradient, fractures will have a tendency to grow up. This tendency to grow up also manifests itself in a commonly heard complaint in the oilfield that in vertical wells, most frack fluid pumped in a well which is perforated in multiple zones goes in to the shallowest zone perfed. From FIG. 1, the upper set of perfs will take most of a frack fluid when multiple zones are open, as the weakest zone will tend to be the shallowest zone and pressures will have difficulty reaching the fracture pressure for the deeper zones as the shallow zones takes frack fluid and keeps surface pressure lower than that needed to open deeper zones.

In order to correct this bias, FIG. 2 shows how using a frack fluid that has a gradient equal to the formation's fracture gradient can create a symmetrical penny shaped frack in an ideal formation where the fluid's density can be maintained to exactly match that of the formations fracture gradient.

In FIG. 3, it is shown how designing a frack fluid which exceeds the formation's fracture gradient will create a fracture that grows both up and down, with a bias in the down direction.

In FIG. 4, it is shown how pumping high density slurries greater than the formation fracture gradient followed by a light fluid with a gradient less than the fracture gradient of the formation can develop a gradient inside the fracture which promotes downward fracture growth.

This invention involves designing low cost (i.e., at costs which will preferably not increase current frack costs by more than 10% for the frack company) frack fluids which can systematically be used to steer the direction in which fractures grow in the vertical direction.

This invention involves the design of fracking fluids that can dramatically improve placement of fractures. This has many implications including ensuring fractures do not grow up into potable and useable water zones and it ensures that fractures stay in zones where hydrocarbons are targeted rather than growing out of zone and wasting frack resources.

In the simplest form, a fracturing fluid can be designed using only a high specific gravity (SG) material in water/oil or other fluid with a particle size distribution designed to control settling rates to achieve desired results. Two such materials are barite and hematite, with Specific Gravities (SG) of 4.2 and 5.4, respectively.

In FIG. 3, for illustration, an extreme case was used for ease of mental calculations. However, it is still very practical and achievable. The 1.5 psi/ft fluid equals a SG of 3.46. To mix a water and barite slurry of a SG of 3.46 one would need to mix 77% by volume of barite with water. However, a similar SG slurry of 3.46 can be mixed with hematite using 56% by volume hematite. Even without friction reducer additive, such a slurry will be pumpable as a proppant to control frack growth direction.

In most cases the design engineer will likely chose to design a slurry which is only 0.1 or 0.2 pounds per gallon heavier than the frack initiation or fracture propogation gradient. Given that frack gradients generally range between 0.6 and 1.0 psi/ft once a well gets below 5000' depth, barite and/or hematite and water only slurries will be very pumpable with the main design parameter required to settle on once the gradient is chosen being the particle size to be pumped. Both barite and hematite have industry specified (API) particle sizes for normal drilling operations and much smaller particle sizes for wells where settling is an issue. For frack designs where the heavy particles need to be carried deep in to the fracture network, the slow settling small product may be desirable. Where quicker settling of the heavy particle is desirable, the larger and standard API certified products will work well.

More complex slurries can also be generated mixing the heavy solid particles with the sand/ceramic/other proppants and water or other carrier fluids to achieve the desired SG for steering the well either up or down. Thus the design engineer will have the option of 1) pumping intermittent slugs of heavy frack fluids between frack fluids with commonly used proppants and densities; 2) mix weighting material directly in to the proppant slurry to be pumped; 3) have 2 slurries, one weighted with a high SG particles such as barite and/or hematite and a normal frack fluid with proppants as needed by the design, where the two slurries can be mixed to deliver varied slurry densities downhole based on design and/or field data requirements.

During fracture initiation, the difference between the fracture pressure required to frack up vs down will be minimal. However, as the fracture dimensions grow in the vertical direction, the control over the fracture's direction of growth will increase using this technique. It is estimated on a typical size fracture on a vertical well, directional control in the vertical direction will be 80% or better toward the end of the job and that fracture growth direction, either the up or down, will be easily controlled.

Figure 6:
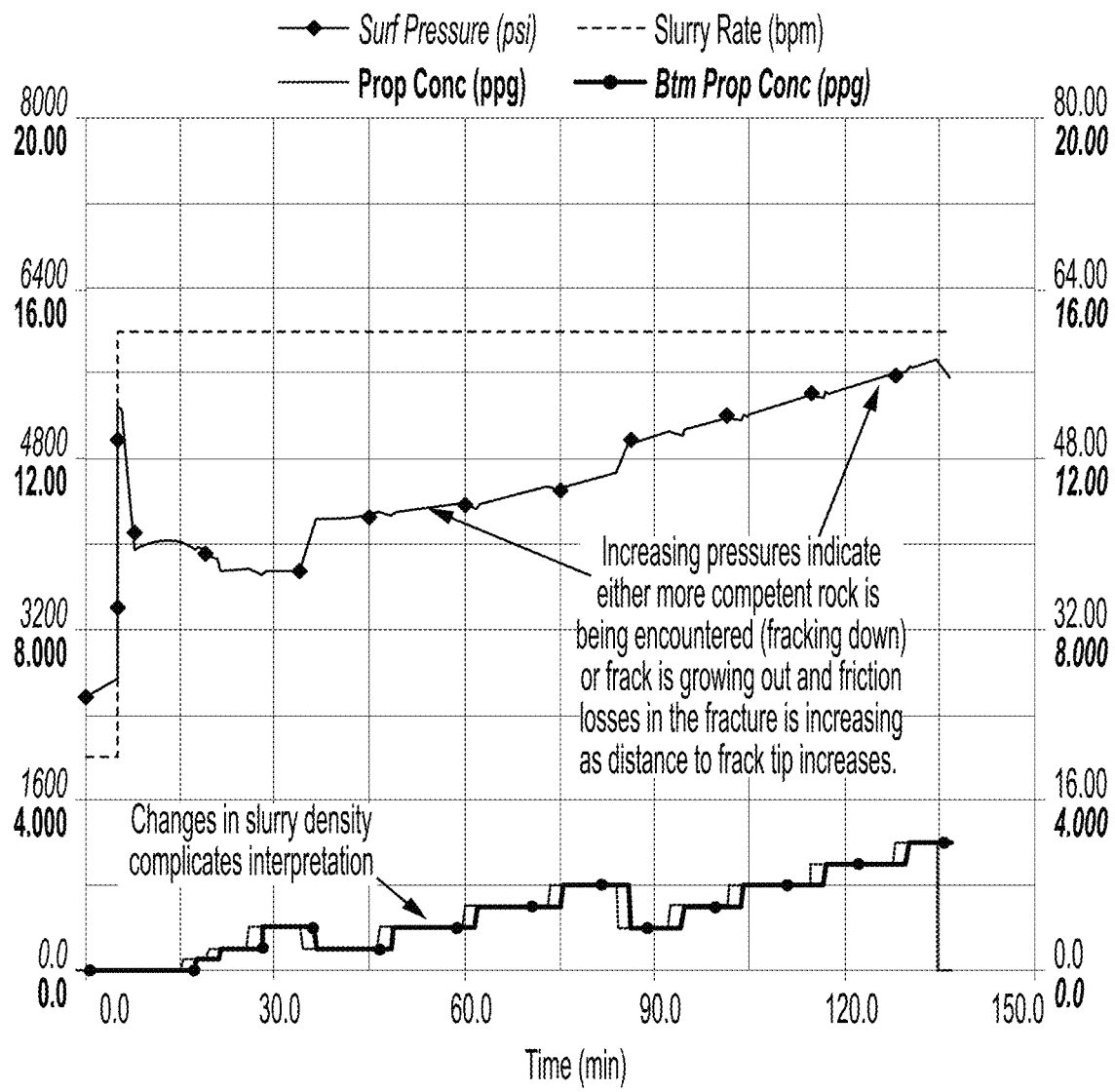
FIG. 6 is a graphical example of downward frack growth.

In FIG. 5, the pump pressure dropped unexpectedly during an operation even though injection rate and slurry densities remained constant. This is a clear example of a fracture breaking out of containment barriers and growing upwards into an overlying formation. After breaking through the containment barrier, the fracture continued growing up in to ever weaker rock until it finally encountered a new containment barrier. This invention allows frack crews to pump a heavy fluid that is either pre-mixed and ready to pump or one which can be mixed on the fly to break the upward growth and steer the fracture growth downward. Once the concentration of weighted slurry in the fracture is great enough that indications of downward and outward growth are seen as shown in FIG. 6, pumping of lighter weight proppant slurries can resume.

Computer control programs and computer controlled pressure manifolds already developed for Managed Pressure Drilling can be easily adapted to monitor real time pressure responses during a frack job and adjust slurry density and injection rates to steer fractures in the up or down directions in real time. For example, pits of pre-mixed slurries of light and a heavy weight proppant can be tied in to an automated manifold. As the control program sees pressure responses indicating unwanted upward growth, the manifold can automatically increase the density of the slurry going downhole. Similarly if unwanted downward growth is seen by the program, it can automatically adjust to pump a lighter slurry.

EXAMPLE

A field implementation was conducted to demonstrate the inventive concepts according to the invention. The objective was to minimize upward growth of the fracture in a horizontal wellbore with a true vertical depth between 5398 to 5424 and with treated perforations in the near horizontal section between 5491 and 5784 measured depth. The perforations being fracked were within the upper portion of a pay zone, which had weak frack barriers to vertical growth. In this case, batches of slurry were mixed to a density that exceeded the fracture propagation gradient in the open formation and alternated with the normal frack fluid carrying the proppant.

TABLE 1

Field Implementation Stages

| Stage | Poz Conc. (lb/gal) | Slurry Yield | Slurry Density (lb/gal) | Yield (cu.ft./sk) | Water Req. (gal/sk) | Stage Vol (gal) | Stage Vol (bbls) | Stg Poz (lbs) | Stg Poz (sks) | Stage Water (gal) | Stage Water (bbls) |
|---|---|---|---|---|---|---|---|---|---|---|---|
| 1 | 2 | 1.10 | 9.49 | 4.42 | 28.94 | 2100 | 50 | 3673.15 | 63 | 1837 | 44 |
| 2 | 15.9 | 1.45 | 16.77 | 1.229 | 5.9 | 840 | 20 | 8564.27 | 91 | 539 | 13 |
| 3 | 2 | 1.10 | 9.49 | 4.42 | 28.94 | 2100 | 50 | 3673.15 | 63 | 1837 | 44 |
| 4 | 15.9 | 1.45 | 16.77 | 1.229 | 5.9 | 1680 | 40 | 17128.53 | 183 | 1077 | 26 |
| 5 | 4 | 1.20 | 10.37 | 2.56 | 15.04 | 4200 | 100 | 13183.50 | 219 | 3296 | 78 |
| 6 | 15.9 | 1.45 | 16.77 | 1.229 | 5.9 | 2520 | 60 | 25692.80 | 274 | 1616 | 38 |
| 7 | 6 | 1.30 | 11.11 | 1.92 | 10.25 | 8400 | 200 | 35939.06 | 584 | 5990 | 143 |
| 8 | 15.9 | 1.45 | 16.77 | 1.229 | 5.9 | 2730 | 65 | 27833.86 | 297 | 1751 | 42 |
| 9 | 8 | 1.40 | 11.74 | 1.59 | 7.73 | 63000 | 1500 | 327285.28 | 5292 | 40911 | 974 |
| 10 | 2 | 1.10 | 9.49 | 4.42 | 28.94 | 8736 | 208 | 15280.32 | 264 | 7640 | 182 |
| 11 | KCL | | | | | 1680 | 40 | | | | 40 |
| TOTAL | | | | | | 97986 | 2333 | 478.254 | 7331 | 66492 | 1623 |

As can be seen in the table in Table 1, a slurry with 2 pounds per gallon of proppant was mixed with fresh water and 2% KCl to initiate the fracture, giving a slurry with a density of 9.49 pound per gallon, which is well below fracture propagation pressure and which would have, as explained in FIG. 1 with a sample of such an occurrence shown in FIG. 5, a bias to grow upward until it met a strong fracture growth barrier. A fracture dominated by upward growth would have been problematic for this horizontal well due to its location high in the pay zone. The light slurry was pumped first to create a large enough fracture with a low solids slurry so that the slurries to follow, with higher densities of solids, would have more area to divert to in case any particular area of the fracture bridged off with solids. This light slurry was then followed by a slurry of 2% KCl water weighted with 15.9 pounds per gallon of barite added to create a slurry of 16.77 pounds per gallon which exceeded the fracture propagation gradient of the formation. This heavy slurry was then followed by another batch of KCl water mixed with 2 pounds per gallon of proppant. This alternating cycle of lighter slurries of proppant and heavy slugs of 16.77 pound per gallon was repeated as per Table 1 such that the lower portion of the vertical fracture created was filled with a fluid with a gradient higher than the fracture propagation pressure for the formation so the fracture would tend to grow down and out, with minimal upward growth. These heavier slurries, once exited the perforations and entered into the fracture, naturally migrated to the lower portion of the fracture due to gravity segregation. By keeping the lower portion of the fracture(s) filled with a heavy slurry, fracture growth is ensured to be biased toward downward growth as explained in FIGS. 3 and 4.

Figure 7:
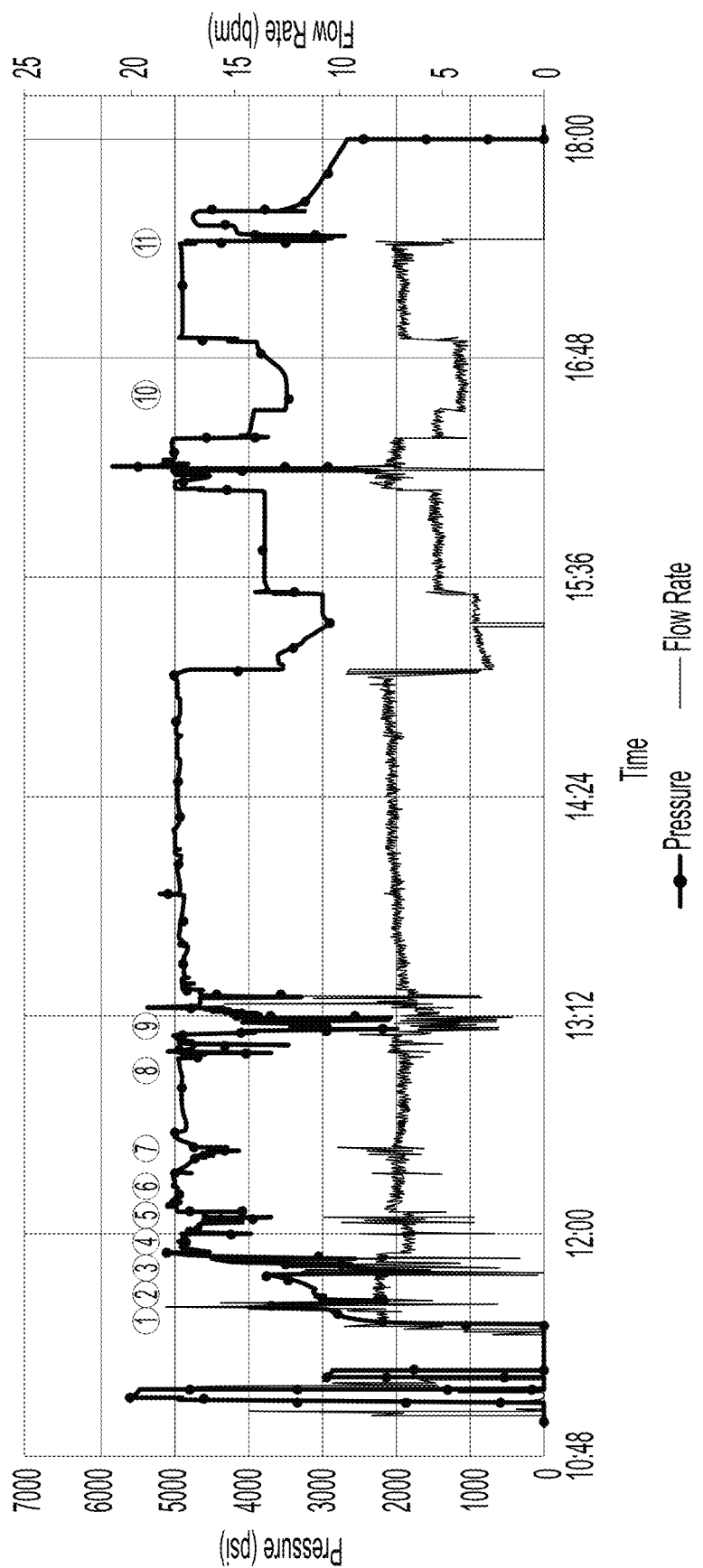
FIG. 7 is a graph of surface pressure vs. time for a fracking operation demonstrating aspects of the invention.

As can be seen in FIG. 7 from pressure data, once the hydrostatic gradients stabilized in between changes in the densities of the slurries pumped, the surface pressure never showed a consistent decline that would have occurred had fracture growth been in an upward direction. Once the final 1500 barrels of 11.74 pound per gallon slurry with proppant was being pumped, if there was any indication of upward growth of the fracture (i.e. if surface pump pressure had begun to decline over time while using a constant pump rate), another heavy 16.77 ppg slurry could have been pumped to mitigate, if not terminate, the upward growth and continued lateral and/or downward fracture growth. However, the schedule of slurries pumped was effective as designed.

This field application also proved that this approach can be easily implemented in the field and that formations are easily fractured with these high density slurries. This well was in a remote location and produced natural gas at a significant rate when tested.

Alternatively, the fracture is more aggressively grown downward by pumping a larger percentage of the heavy fluid and/or the slurry is weighted to a much higher density (above the 16.77 ppg pumped) using either barite or hematite (or any other high specific gravity particulate).

It is understood that variations may be made in the above without departing from the scope of the invention. While specific embodiments have been shown and described, modifications can be made by one skilled in the art without departing from the spirit or teaching of this invention. The embodiments as described are exemplary only and are not limiting. Many variations and modifications are possible and are within the scope of the invention. Furthermore, one or more elements of the exemplary embodiments may be omitted, combined with, or substituted for, in whole or in part, one or more elements of one or more of the other exemplary embodiments. Accordingly, the scope of protection is not limited to the embodiments described, but is only limited by the claims that follow, the scope of which shall include all equivalents of the subject matter of the claims.

The invention claimed is:

1. A method of steering at least one fracture in a subterranean formation comprising:
   pumping at least one of a first fracturing fluid and a first slurry into the subterranean formation, wherein the at least one of the first fracturing fluid and the first slurry has a first pressure gradient higher than a formation fracture gradient;
   growing the fracture in a first direction;
   monitoring, during the pumping, at least one of a) a surface pressure at a manifold, b) a downhole pressure of the at least one of the first fracturing fluid and the first slurry, c) a downhole temperature of the at least one of the first fracturing fluid and the first slurry, and d) a seismic data indicative of a vertical growth of the at least one fracture;
   determining, during pumping, the first direction in which the at least one fracture is growing;
   at least one of a) adjusting, during pumping, the first pressure gradient of the at least one of the first fracturing fluid and the first slurry and b) pumping at least one of a second fracturing fluid and a second slurry into the subterranean formation, wherein the at least one of the second fracturing fluid and the second slurry has a second pressure gradient different than the first pressure gradient; and,
   changing, during pumping, the first direction in which the at least one fracture is growing to a second direction.

2. The method of claim 1, wherein the second direction is one of a) upward and b) downward relative to the first direction.

3. The method of claim 2, wherein at least 80% of the second direction is downward.

4. The method of claim 1, wherein adjusting the first pressure gradient comprises at least one of:
   a) adding at least one of a barite material and a hematite material to the at least one of the first fracturing fluid and the first slurry;
   b) adjusting a density of a proppant in a carrier fluid that comprises at least a part of the at least one of the first fracturing fluid and the first slurry;
   c) adjusting a density of the carrier fluid of the at least one of the first fracturing fluid and the first slurry; and,
   d) adding a material with a specific gravity of at least 3.0 to the at least one of the first fracturing fluid and the first slurry.

5. The method of claim 1, further comprising adjusting, during pumping, the second pressure gradient of the at least one of the second fracturing fluid and the second slurry.

6. The method of claim 1, wherein adjusting the second pressure gradient comprises at least one of:
   a) adding at least one of a barite material and a hematite material to the at least one of the second fracturing fluid and the second slurry;
   b) adjusting a density of a proppant in a carrier fluid that comprises at least a part of the at least one of the second fracturing fluid and the second slurry;
   c) adjusting a density of the carrier fluid of the at least one of the second fracturing fluid and the second slurry; and,
   d) adding a material with a specific gravity of at least 3.0 to the at least one of the second fracturing fluid and the second slurry.

7. The method of claim 1, further comprising alternately pumping the at least one of the first fracturing fluid and the first slurry and the at least one of the second fracturing fluid and the second slurry at least twice.

8. The method of claim 1, further comprising pumping at least one of a third fracturing fluid and a third slurry into the subterranean formation, wherein the at least one of the third fracturing fluid and the third slurry has a third pressure gradient different than at least one of the first pressure gradient and the second pressure gradient.

9. An automated computer control and pressure manifold system configured to steer at least one fracture in a subterranean formation comprising:
   a computer control program configured to perform the method of claim 1;
   a manifold operable by the computer control program;
   at least a first pit configured to hold the at least one of the first fracturing fluid and the first slurry of claim 1, the at least a first pit being fluidly coupled to the manifold; and, at least a second pit configured to hold the at least one of the second fracturing fluid and the second slurry of claim 1, the at least a second pit being fluidly coupled to the manifold.

10. The automated computer control and pressure manifold system of claim 9, wherein the manifold is fluidly coupled to a wellbore disposed within the subterranean formation.

* * * * *